United States Patent
Matsubayashi et al.

[11] Patent Number: 5,851,699
[45] Date of Patent: Dec. 22, 1998

[54] TOGGLE TYPE VERTICAL CLAMPING APPARATUS USING ELECTRIC MOTOR

[75] Inventors: Kouichi Matsubayashi; Nobusuke Takahashi, both of Nagano-ken, Japan

[73] Assignee: Nissei Plastic Industrial Co., Ltd., Nagano-ken, Japan

[21] Appl. No.: 944,239

[22] Filed: Oct. 6, 1997

[30] Foreign Application Priority Data

Oct. 9, 1996 [JP] Japan ................................ 8-268968

[51] Int. Cl.⁶ .................................................. B29C 45/66
[52] U.S. Cl. ............. 429/593; 425/451.6; 425/DIG. 127
[58] Field of Search ................ 425/451–6, 593, 425/DIG. 127

[56] References Cited

U.S. PATENT DOCUMENTS

| | | | |
|---|---|---|---|
| 2,113,115 | 4/1938 | MacMillin et al. | 425/593 |
| 2,416,348 | 2/1947 | Renier | 425/593 |
| 2,711,567 | 6/1955 | Knapp | 425/593 |
| 5,164,203 | 11/1992 | Tanaka et al. | 425/593 |
| 5,332,382 | 7/1994 | Kasai et al. | 425/593 |
| 5,511,963 | 4/1996 | Hehl | 425/451.6 |
| 5,513,977 | 5/1996 | Kitajima | 425/451.6 |

FOREIGN PATENT DOCUMENTS 6-143079  6/1994  Japan.

*Primary Examiner*—James P. Mackey
*Attorney, Agent, or Firm*—Weingarten, Schurgin, Gagnebin & Hayes LLP

[57] ABSTRACT

A toggle mechanism in a vertical clamping apparatus for an injection mold is supported by spring forces when operated by an electric motor in the vicinity of the mold's closing to counteract the effect of gravity on operation of the mold.

3 Claims, 4 Drawing Sheets

TOGGLE TYPE VERTICAL CLAMPING APPARATUS USING ELECTRIC MOTOR

BACKGROUND OF THE INVENTION

1. Field of the Invention

This invention relates to a toggle type vertical clamping apparatus using an electric motor with a toggle mechanism of which a link is expanded and contracted by rotating a ball screw shaft by an electric motor.

2. Background Art

By utilizing an electric motor such as an electric servo motor as a driving source of an injection molding machine, a toggle mechanism which has been used in a transverse clamping apparatus previously has allowed to utilize in a vertical clamping apparatus. However, due to using the toggle mechanism longitudinally the mechanism is susceptible to an effect of gravity which can be neglected in a transverse operation, and control of the clamping by the electric motor in the vicinity at which mold closing is completed becomes difficult due to gravity applied thereto. In a case where an appropriate protection for the mold can not be performed, there have been the problems that the molds are damaged, when foreign matters are deposited between the molds which are separated and installed on a molding base and a movable platen.

SUMMARY OF THE INVENTION

The present invention is designed to solve the aforementioned problems, and an object of the invention is to provide an improved vertical clamping apparatus that difficulty of control of the clamping due to gravity in case of installing the toggle mechanism longitudinally can be precluded by utilizing a spring member.

The present invention according to said object provides a vertical clamping apparatus, said apparatus comprising a toggle mechanism including a pressure receiving plate and a link expanding and contracting by a ball screw shaft installed on a central portion of the pressure receiving plate, said toggle mechanism being provided in a machine bed longitudinally by reaction force against a mold base fixed on the machine bed; a plurality of pulling shafts inserted through said molding base and connected to the pressure receiving plate at a lower end of the link; a movable platen connected to the upper end of the pulling shafts horizontally to the molding base; and an electric motor as a driving source, wherein said apparatus further comprises, on said pressure receiving plate, means for offsetting gravity acting on said pressure receiving plate by means of touching to ground and for enabling the apparatus to control the clamping by said electric motor, said means comprising a spring member.

Moreover, the invention is provided with the apparatus comprising a supporting rod inserted perpendicularly through said pressure receiving plate and between the lower end of the supporting rod projected downwardly from the pressure receiving plate and the pressure receiving plate, means for offsetting gravity acting on said pressure receiving plate by means of touching to ground and for enabling the apparatus to control the clamping by said electric motor, said means comprising a spring member.

In the above constitution, when the movable platen is lowered by extension of the link and the mold on the movable platen is closed up to the vicinity of the mold on the molding base, the spring member is compressed to counter against gravity acting on said pressure receiving plate. Therefore, a force upward acted on the ball nut in a link operating member screwed to the ball screw shaft as reaction force of gravity is excluded to remove a load against the ball screw shaft to remove a rotating force except the setting force to the ball screw shaft, and as a result, control of the clamping by the electric motor can be performed readily.

DETAILED DESCRIPTION OF THE PREFERRED EMBODIMENTS

Figure 1:
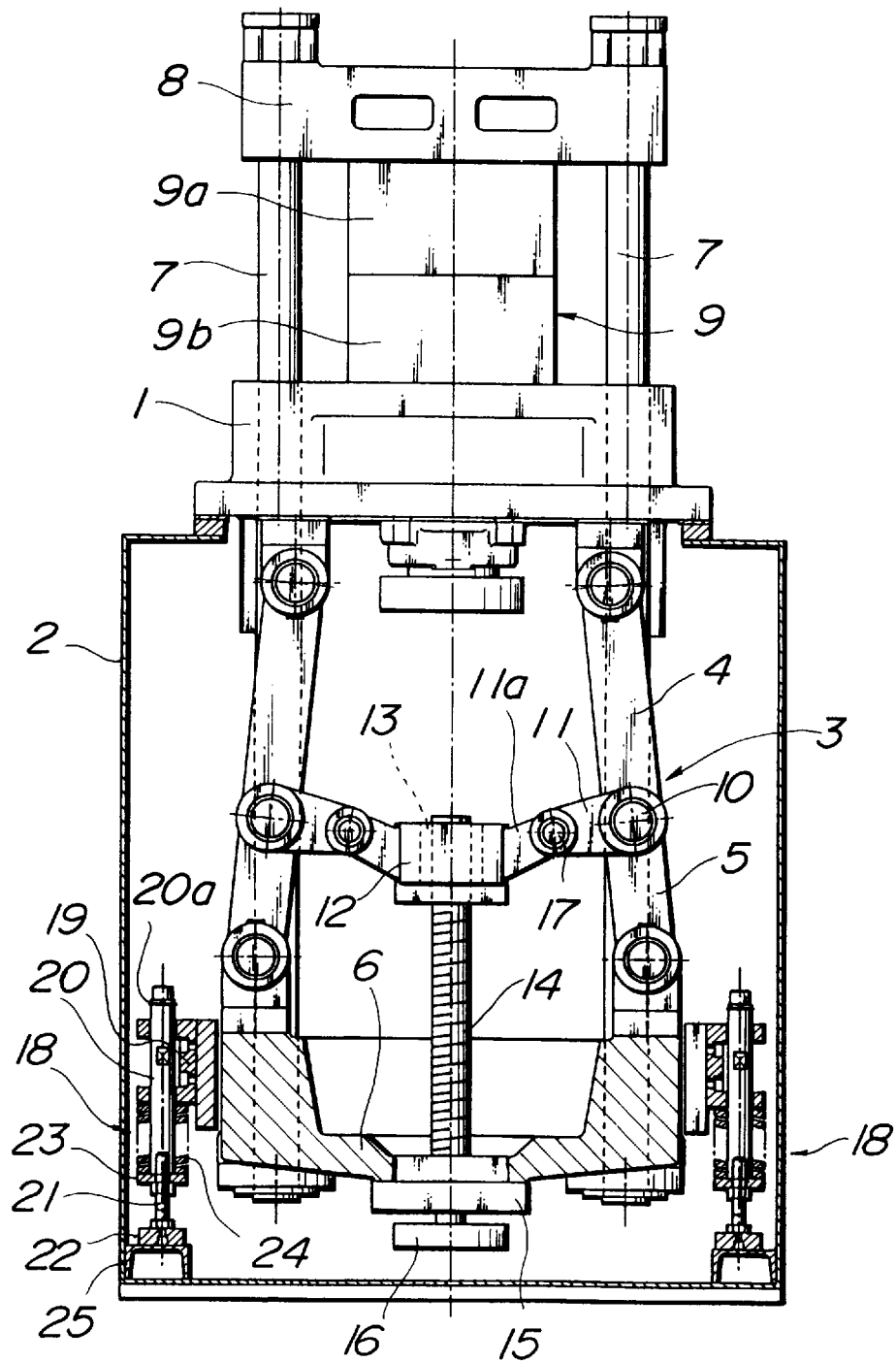
FIG. 1 is a schematic longitudinal front view of a preferred embodiment when closing the mold by the electric motor-toggle type vertical clamping apparatus according to the present invention.
Figure 2:
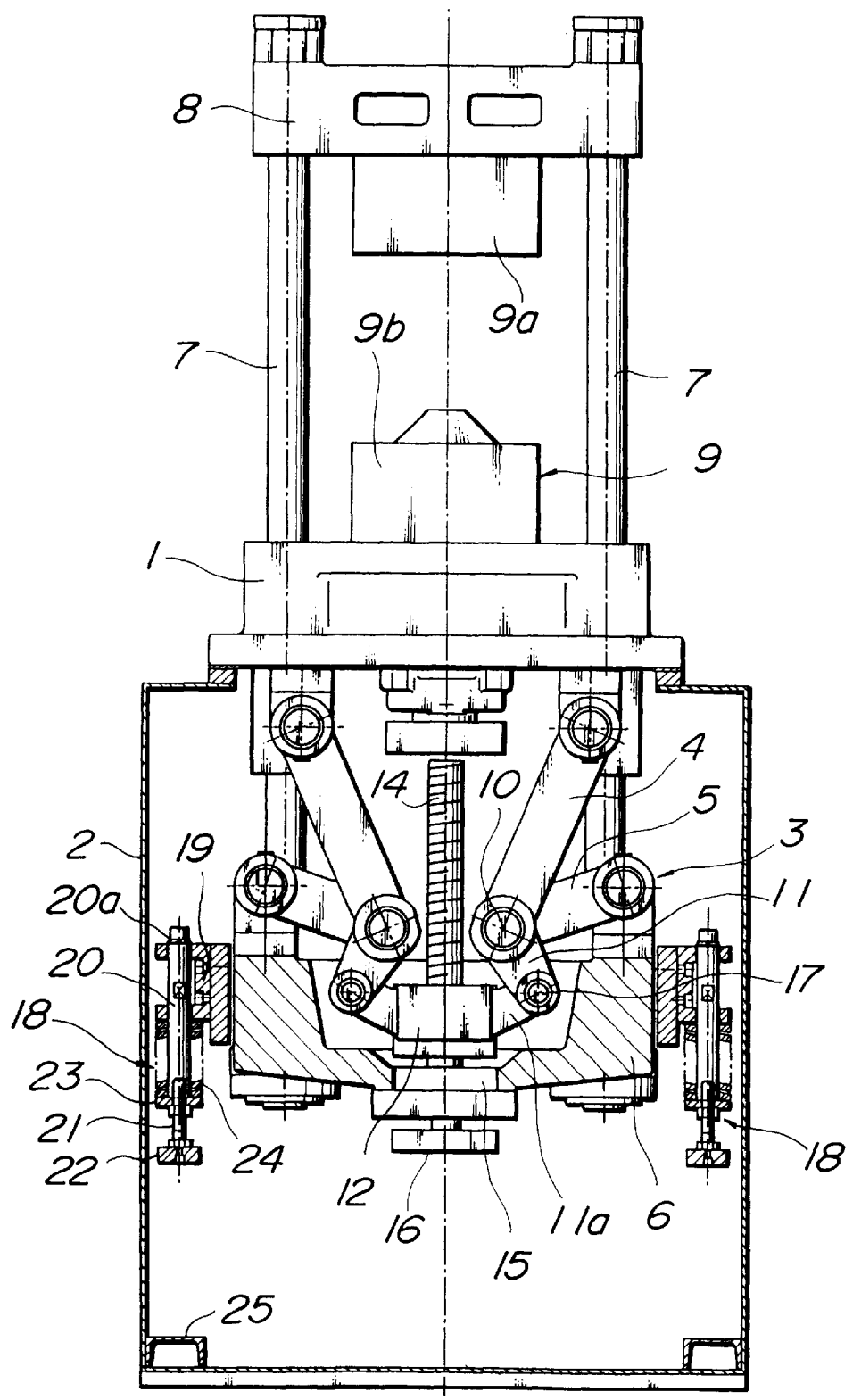
FIG. 2 is a schematic longitudinal front view of the preferred embodiment shown in FIG. 1 when opening the mold by the electric motor-toggle type vertical clamping apparatus according to the present invention

In FIGS., numeral 1 designates a mold base mounted and fixed on a upper surface of a machine bed 2 horizontally, numeral 3 designates a toggle mechanism with the so-called double link installed longitudinally so as to be applied a reaction force against the mold base side inside the machine bed 2, and said toggle mechanism comprises a pair of links 4 and expanding and contracting upwardly and downwardly and a pressure receiving plate 6 connected by pins with the links. Lower ends of pulling shafts 7, 7 for clamping installed movably upwardly and downwardly through the molding base 1 and connected with the four corners of the pressure receiving plate 6. Moreover, on the upper ends of the pulling shafts 7, a movable platen 8 is connected horizontally to the mold base 1.

Above the movable platen 8, an injection apparatus comprising a heating cylinder and a screw is installed longitudinally so as to direct the heating cylinder to a downward direction (not shown). On the opposite surfaces of the mold base 1 and the movable platen 8, an injection mold 9 comprising a pair of separated molds 9a and 9b is installed in the separated conditions, and the pair of the mold 9a and 9b can be opened or closed depending to lifting or lowering of the movable platen 8.

Said toggle mechanism 3 is constituted in such a manner that a pair of the links 4 are used as upper links lower ends of which are connected rotatably with a pair of operating links 11 by pivot pins 10 and upper ends of which are connected to the mold base 1 by pins, and a pair of the links are used as lower links upper ends of which are connected rotatably with the operating links 11 by the pins 10 and lower ends of which are connected to the pressure receiving plate 6 by pins.

Moreover, on a central portion of the link mechanism 3, a ball screw shaft 14 screwed to a ball nut 13 mounted in a link operating member 12 is inserted through and held rotatably and perpendicularly by a bearing member 15 fitted to and fixed within the pressure receiving plate 6, and the link operating member 12 and ear pieces 11a of said operating links 11 are jointed pivotally by pins 17.

A pulley 16 for rotation driving is mounted on the axial end projected from the bearing member 1of said ball screw shaft 14 downwardly, and the rotation driving of an electric servo motor (not shown) is transmitted to the pulley 16 by a belt for driving, thereby the ball screw shaft 14 being rotated, and said operating member 12 is moved in an axial direction by the rotation to pull or push a pivot portion to expand and contract the upper and the lower links 4 and 5 in the upper and lower direction.

Numeral 18 designates a gravity offsetting means provided on both the sides of said pressure receiving plate 6, and is constituted by a bearing 19 screwed to a lateral surface of said pressure receiving plate, a supporting rod 20 having a required length inserted through and supported by the bearing 19 movably upwardly and downwardly, a member 22 for touching with the ground provided on the lower end of the supporting rod in such manner that the height thereof can be adjusted freely by a bolt 21, a coil-shaped spring member 24 provided between the bearing 19 and a flange 23 at a lower end of the supporting rod 20, and a wedge 20a installed on the upper end of the supporting rod 20.

The height of said member 22 for touching with the ground is adjusted to be touched to a frame 25 of the bottom of the machine bed before the toggle mechanism 3 is completely expanded. When the movable platen is lowered by extension of the links and the mold 9a on the movable platen is closed to the vicinity the mold 9b on the molding base, the member 22 for touching with the ground touches to said frame 5. By touching with the ground, the spring member 24 is loaded to withstand against gravity acted on the pressure receiving plate 6.

Therefore, on the ball nut 13 in the link operating member 12 screwed to the ball screw shaft 14, a force upward acted as reaction force of gravity is excluded to remove a load against the ball screw shaft 14. Therefore, the rotating force except the setting force to the ball screw shaft by the load is removed, the molds 9a and 9b become possible to contact under low pressure, and as a result, control of the clamping in the vicinity at which mold closing is completed becomes possible by the electric motor.

Figure 3:
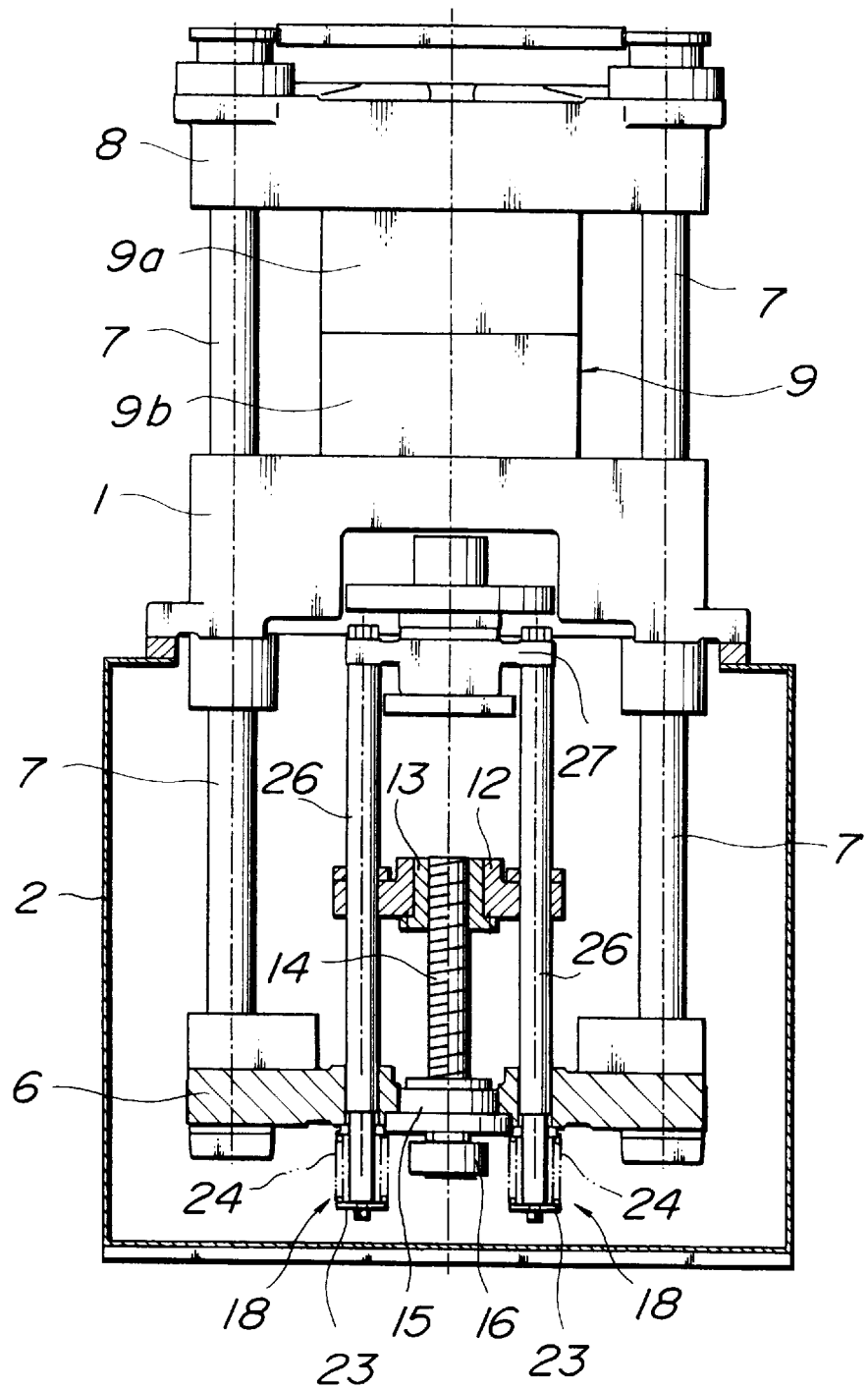
FIG. 3 is a schematic longitudinal front view of another preferred embodiment when closing the mold according to the present invention.
Figure 4:
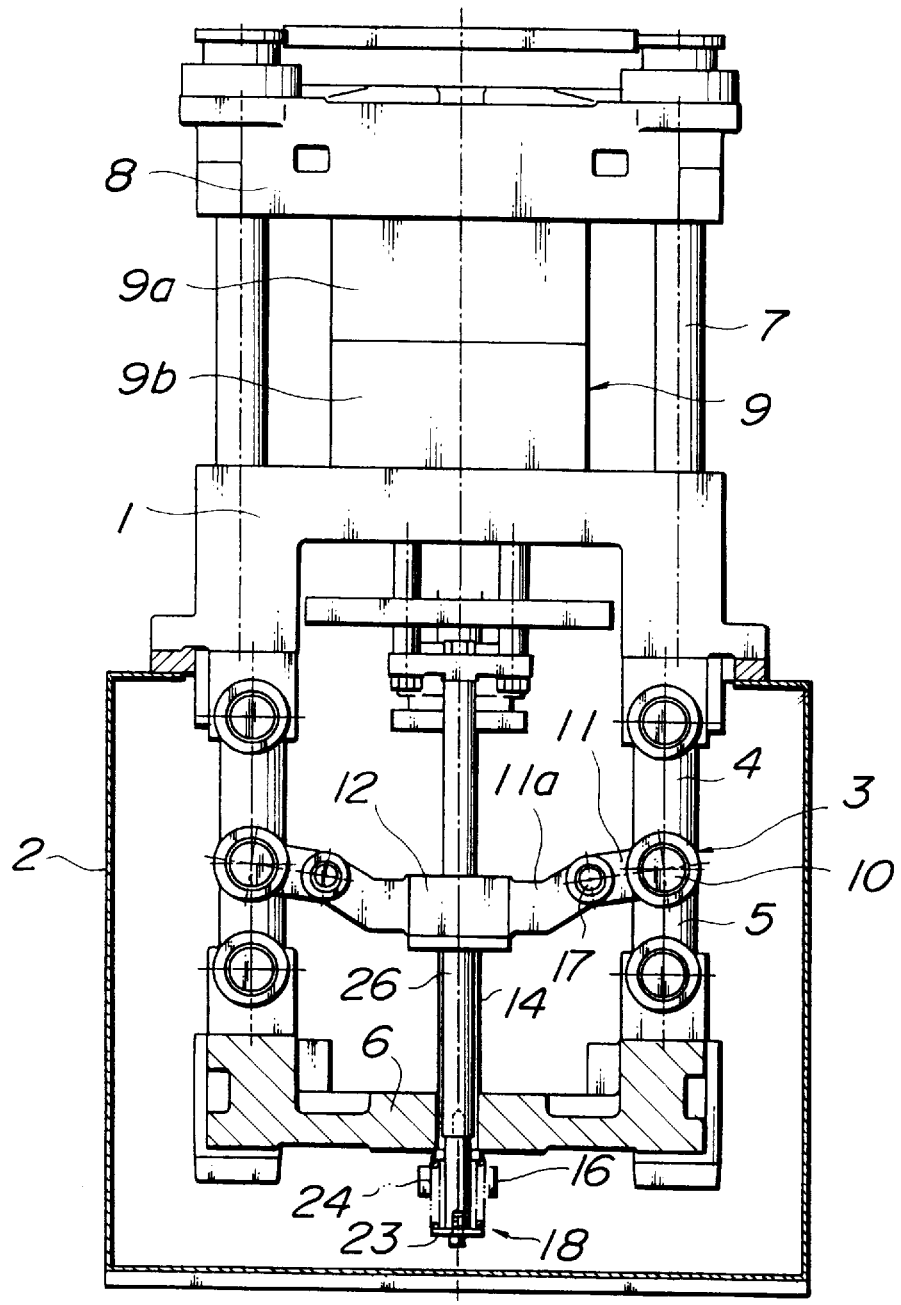
FIG. 4 is a schematic longitudinal front view of the preferred embodiment shown in FIG. 3 when opening the mold according to the present invention.

FIGS. 3 and 4 show another embodiment that the gravity offsetting means are provided between the pressure receiving plate 6 and the lower end of supporting rods 26.

A pair of the supporting rods 26 are installed perpendicularly through said pressure receiving plate 6 and fixed at the upper end of the supporting rods 26 on a supporting plate 27 provided at a central portion of the underside of the molding base 1. Said link operating member 12 is inserted through movably upwardly and downwardly by the supporting rods 26. Moreover, said flange 23 is fixed by a bolt on a lower end of the rod projected downwardly from the pressure receiving plate 6, and said spring member 24 is disposed between the flange 23 and the pressure receiving plate 6.

In such the constitution, also, in the vicinity at which mold closing is completed before the upper and the lower links 4 and are completely expanded, the spring member 24 acts so as to offset all gravity loaded on the pressure receiving plate 6, whereby control of the clamping by the electric servo motor in the vicinity at which mold closing is completed can be performed readily.

Since the spring member 24 is installed with the objective of offsetting gravity in both of said embodiments, the spring force utilized therein is set depending on the load in the pressure receiving plate 6. Accordingly, although it is ideal that the applied load equals to the spring force, there is no problems even though either of the load or the spring force exceeds the other, and for example, when two spring member 24 are used, the purpose can be achieved with the conditions of 900 kg in a load and 500 kg in spring force x 2 pieces of the spring member, and such a spring force has a margin of deflection by a further load hen being within such range set, whereby control of the clamping under low pressure is not effected and a smooth shift to control of the clamping under high pressure also becomes possible.

When the toggle mechanism is constituted longitudinally by such offsetting of gravity by the spring member 24, magnifying power of force and the changes in velocity by typical operation position of the toggle can be obtained, and furthermore, control from the closing to the mold clamping also can be performed without an effect of gravity, whereby protection of the mold upon the mold clamping can be performed securely even in case of utilizing the electric motor as a driving force.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. Apparatus comprising:
   a toggle housing having a top and a bottom separated by a space;
   a mold base on the top of the toggle housing, the mold base being adapted to support a mold lower part;
   a platen adapted to support a mold lower part, the platen being attached to a pair of pulling shafts extending through the mold base and the top of the toggle housing into the space within the toggle housing such that the mold upper and lower parts when supported by the mold base and platen are opened and closed by vertical movement of the pulling shafts from within the space; and a toggle mechanism disposed within the toggle housing space, the toggle mechanism including a pressure receiving plate connected to the pulling shafts, a pair of pivot joined upper and lower links connecting the pressure receiving plate to the mold base, a link operating member connected to the links at their pivot, a ball screw shaft installed on a central portion of the pressure receiving plate, the ball screw shaft extending through a threaded opening of the link operating member and being adapted for rotation by an electric motor such that rotation of the ball screw shaft causes the links to pivot between a position of mold closure in which the links form a large angle and a position of mold openness in which the links form a smaller angle, and one or more spring members disposed between the pressure receiving plate and the bottom of the toggle housing to counteract the effect of gravity when the toggle mechanism is being operated to close a mold by pivoting the links toward the large angle, whereby mold closing force is more completely controlled by the links.

2. Apparatus according to claim 1, wherein the toggle mechanism further comprises:
   a bearing screwed to a lateral surface of said pressure receiving plate;
   a supporting rod inserted through and supported by the bearing so as to be movable upwardly and downwardly; and
   a member provided on the lower end of the supporting rod in such a manner that the distance of the member from the lower end of the supporting rod can be adjusted freely by a bolts;

and wherein the spring member is provided between the bearing and a flange at the lower end of the supporting rod, and a wedge is installed on the upper end of the supporting rod to retain the supporting rod on the bearing.

3. Apparatus comprising:

a toggle housing having a top and a bottom separated by a space;

a mold base on the top of the toggle housing, the mold base being adapted to support a mold lower part;

a platen adapted to support a mold lower part, the platen being attached to a pair of pulling shafts extending through the mold base and the top of the toggle housing into the space within the toggle housing such that the mold upper and lower parts when supported by the mold base and platen are opened and closed by vertical movement of the pulling shafts from within the space; and a toggle mechanism disposed within the toggle housing space, the toggle mechanism including a pressure receiving plate connected to the pulling shafts, a pair of pivot joined upper and lower links connecting the pressure receiving plate to the mold base, a link operating member connected to the links at their pivot, a ball screw shaft installed on a central portion of the pressure receiving plate, the ball screw shaft extending through a threaded opening of the link operating member and being adapted for rotation by an electric motor such that rotation of the ball screw shaft causes the links to pivot between a position of mold closure in which the links form a large angle and a position of mold openness in which the links form a smaller angle, a supporting rod inserted perpendicularly through said pressure receiving plate and secured to the mold base, and a spring member disposed between the underside of the pressure receiving plate and a flange at the lower end of the supporting rod to counteract the effect of gravity when the toggle mechanism is being operated to close a mold by pivoting the links toward the large angle, whereby mold closing force is more completely controlled by the links.

* * * * *

UNITED STATES PATENT AND TRADEMARK OFFICE
CERTIFICATE OF CORRECTION

PATENT NO.  : 5,851,699
DATED       : December 22, 1998
INVENTOR(S) : Kouichi Matsubayashi, et al.

It is certified that error appears in the above-identified patent and that said Letters Patent is hereby corrected as shown below:

Column 2, line 33, "links 4 and expanding" should read --links 4 and 5 expanding--.

Column 2, line 54, "links are" should read --links 5 are--.

Column 2, line 67, "1of" should read --15 of--.

Column 3, line 15, "supporting rod" should read --supporting rod 20--.

Column 3, line 28, "frame 5" should read --frame 25--.

Column 3, lines 55 and 56, "4 and are" should read --4 and 5 are--.

Column 4, line 4, "load hen" should read --load when--.

Column 4, line 67, claim 2, "by a bolts;" should read --by a bolt;--.

Signed and Sealed this

Twenty-eighth Day of September, 1999

Attest:

Q. TODD DICKINSON

*Attesting Officer*        *Acting Commissioner of Patents and Trademarks*